2,823,185

LAUNDRY AIDS

Theodore A. Seegrist, McLean, Va.

No Drawing. Original application January 26, 1951, Serial No. 208,051. Divided and this application May 13, 1955, Serial No. 514,411

2 Claims. (Cl. 252—303)

(Granted under Title 35, U. S. Code (1952), sec. 266)

The invention herein described may be manufactured and used by or for the Government of the United States of America for governmental purposes throughout the world, without the payment to me of any royalty thereon.

This application is a division of my application Serial No. 208,051, filed January 26, 1951, now abandoned.

Sodium carboxymethyl cellulose, hereinafter referred to as CMC, is valuable when suitably applied to fabrics, especially cotton goods, in connection with their laundering. It renders them more resistant to soiling and the soil more easily removed in subsequent washing.

CMC dissolves fairly easily, provided the water is brought into contact with the individual CMC particles. A body of the dry CMC, however, absorbs water slowly to form a jel. Lumps tend to form which become surface impervious due to swelling of the surface molecules, thus to hinder free penetration of the water. Such lumps are not easily broken up, and on standing become wetted through only after a considerable time.

If, however, the dry CMC is dispersed well in the water, it soon forms a clear solution of varying viscosity depending on the CMC concentration, but no definite demarcation between the dispersed and dissolved state can be made. Accordingly, the term "disperse" or "dispersion" as used herein is intended to include "dissolve" or "solution" where such meaning is applicable.

An object of the invention is to render the CMC more easily dispersed.

Such object may be accomplished by incorporating with the CMC a small amount of wetting agent thus to produce a highly concentrated CMC curd which can be readily dispersed in water to give any desired concentration of the dissolved CMC.

Many wetting agents, variously referred to as synthetic detergents or emulsifiers, are available for the purpose. These include in general the sodium (or other alkali metal) organic radical sulfates or sulfonates. Sodium lauryl sulfonate is characteristic of the sodium alkyl sulfonate group.

Many of the wetting agents and soaps are of an amorphous or waxy nature. It is possible to associate these directly with the CMC provided this is properly accomplished. For this purpose an emulsion is formed of water and a water-immiscible liquid which is inert toward the CMC, using the desired wetting agent as the emulsifier. The CMC is mixed in the emulsion. The water with the emulsifier or wetting agent is drawn into the CMC and is retained therein leaving the water-immiscible liquid separated which may then be expressed in major portion and the remainder evaporated from the formed aqueous curd and recovered for subsequent use. In this manner a curd having at least, by weight, with the water and emulsifying or wetting agent contained therein 20% CMC may be easily and economically produced. This curd is readily dispersible and is only about from 1½ to 2 times the volume of the original dry CMC.

Any water-immiscible, inert liquid which can be emulsified in water with the desired wetting agent may be used for the purpose. Liquids which may be mentioned include the petroleum hydrocarbons, including the chlorine substituted ones like carbon tetrachloride, benzene, the animal and vegetable oils, etc. Of these the volatile hydrocarbons, like white gasoline or a casing head gas, are preferred for reasons of economy.

The following examples exhibit the invention in greater detail.

*Example I*

One half teaspoonful of a commercial sodium lauryl sulfonate was dissolved in 1 pint water.

An emulsion was formed with 2 oz. gasoline and 2 oz. of the water containing the emulsifier, or wetting agent.

CMC was mixed in the emulsion. A dough-like curd formed from which the gasoline was easily expressed to give substantially complete recovery of the gasoline. The emulsifier remained with the water in the curd which was about 20 percent CMC. Residual gasoline could be easily dried from the curd which broke up and spread thin easily. The curd dispersed very easily to give a desired CMC concentration.

*Example II*

Two emulsions were formed, one with 1 part kerosene and 2 parts water, and one with 2 parts kerosene and 1 part water, using dioctyl sodium sulfo-succinate as the emulsifier.

CMC was mixed into each giving results the same as in Example I.

An aqueous emulsion of any water-immiscible liquid which by itself does not swell or dissolve the CMC works similarly. The emulsion may be a naturally occurring one. The process is accordingly of general applicability in separating water from the water-immiscible liquid in systems of this kind.

In laundry use the dough-like curd is dispersed in water to give a desired concentration of CMC which may range about from .10 to 5.0 percent in which the washed fabric is given a final rinse to size it and is then dried in the usual manner. Concentrations from .10 to .60 percent are effective to accomplish all purposes of the CMC treatment. Ranges of CMC concentration higher than this result in sizing effects with varying stiffness, the higher concentration resulting in a very stiff fabric.

I claim:

1. A process comprising forming an emulsion of a water-immiscible liquid, which is inert toward sodium carboxymethyl cellulose, in water in the presence of an emulsifying agent, and mixing sodium carboxymethyl cellulose therewith to form a curd having at least 20% sodium carboxymethyl cellulose, by weight, with the water and emulsifying agent contained therein and with the water-immiscible liquid separated.

2. A process of separating a water-immiscible liquid which is inert toward sodium carboxymethyl cellulose from an emulsion of the liquid in water, comprising mixing sodium carboxymethyl cellulose with the emulsion to form a curd having at least 20% sodium carboxymethyl cellulose, by weight, which curd contains the water and from which the water-immiscible liquid separates.

References Cited in the file of this patent

UNITED STATES PATENTS 2,578,888    Kaveler _____ Dec. 18, 1951